(12) United States Patent
Stout et al.

(10) Patent No.: US 10,435,297 B2
(45) Date of Patent: Oct. 8, 2019

(54) CRYSTALLIZATION AND STABILIZATION IN THE SYNTHESIS OF MICROCRYSTALLINE ALPHA ALANE

(71) Applicant: Ardica Technologies, Inc., San Francisco, CA (US)

(72) Inventors: David Stout, Palo Alto, CA (US); Henry Fong, Menlo Park, CA (US); Elisabeth McLaughlin, Millbrae, CA (US); Paul E. Penwell, Menlo Park, CA (US); Mark A. Petrie, Santa Clara, CA (US); Robert Wilson, Palo Alto, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 0 days.

(21) Appl. No.: 15/184,962

(22) Filed: Jun. 16, 2016

(65) Prior Publication Data

US 2016/0368768 A1    Dec. 22, 2016

Related U.S. Application Data

(63) Continuation-in-part of application No. 13/671,090, filed on Nov. 7, 2012, now Pat. No. 9,676,625.

(60) Provisional application No. 61/556,738, filed on Nov. 7, 2011, provisional application No. 62/181,120, filed on Jun. 17, 2015, provisional application No. 62/181,129, filed on Jun. 17, 2015.

(51) Int. Cl.
| | |
|---|---|
| *C01B 6/06* | (2006.01) |
| *C01B 3/00* | (2006.01) |
| *C01D 15/04* | (2006.01) |

(52) U.S. Cl.
CPC .............. *C01B 6/06* (2013.01); *C01B 3/0026* (2013.01); *C01D 15/04* (2013.01); *Y02E 60/327* (2013.01)

(58) Field of Classification Search
None
See application file for complete search history.

(56) References Cited

U.S. PATENT DOCUMENTS

| | | | |
|---|---|---|---|
| 3,032,037 A | 5/1962 | Havirco et al. | |
| 3,129,163 A | 4/1964 | Stern et al. | |
| 3,184,528 A | 5/1965 | Norwalk | |
| 3,801,657 A | 4/1974 | Scruggs | |
| 3,801,707 A | 4/1974 | Ardis et al. | |
| 3,810,974 A | 5/1974 | King et al. | |
| 3,812,244 A | 5/1974 | Schmidt et al. | |
| 3,816,192 A | 6/1974 | Brower et al. | |
| 3,819,335 A | 6/1974 | Daniels et al. | |
| 3,819,819 A | 6/1974 | Matzek et al. | |
| 3,821,044 A | 6/1974 | Roberts | |
| 3,823,226 A | 7/1974 | Brower et al. | |
| 3,826,820 A | 7/1974 | Roberts et al. | |
| 3,838,194 A | 9/1974 | Reigler et al. | |
| 3,838,195 A | 9/1974 | Reigler et al. | |
| 3,840,654 A | 10/1974 | Schmidt et al. | |
| 3,843,774 A | 10/1974 | York | |
| 3,850,709 A | 11/1974 | Schmidt | |
| 3,857,930 A | 12/1974 | Kraus et al. | |
| 3,869,544 A | 3/1975 | Niles et al. | |
| 3,869,545 A | 3/1975 | Terada et al. | |
| 3,883,644 A | 5/1975 | Matzek et al. | |
| 4,006,095 A | 2/1977 | Hoffman et al. | |
| 4,048,087 A | 9/1977 | Daniels et al. | |
| 4,370,294 A | 1/1983 | Franken et al. | |
| 4,395,219 A | 7/1983 | Franken et al. | |
| 4,747,701 A | 5/1988 | Perkins | |
| 5,292,387 A | 3/1994 | Highsmith et al. | |
| 5,670,129 A | 9/1997 | Klapdor et al. | |
| 5,730,952 A | 3/1998 | Rathman et al. | |
| 6,228,338 B1 | 5/2001 | Petrie et al. | |
| 6,617,064 B2 | 9/2003 | Petrie et al. | |
| 7,238,336 B2 | 7/2007 | Lund et al. | |
| 7,521,037 B1 | 4/2009 | Graetz et al. | |
| 9,228,267 B1 | 1/2016 | Crouch-Baker | |
| 9,327,974 B1 | 5/2016 | Petrie | |
| 9,676,625 B1 | 6/2017 | Petrie et al. | |
| 10,233,079 B2 | 3/2019 | Stout et al. | |
| 10,246,785 B2 | 4/2019 | Crouch-Baker et al. | |
| 2001/0038821 A1 | 11/2001 | Petrie et al. | |
| 2006/0249393 A1 | 11/2006 | Ghosh et al. | |
| 2007/0056970 A1 | 3/2007 | Scherer et al. | |
| 2007/0066839 A1 | 3/2007 | Lund et al. | |

(Continued)

FOREIGN PATENT DOCUMENTS

| | | |
|---|---|---|
| DE | 10392795 T5 | 6/2005 |
| GB | 833646 A | 4/1960 |

(Continued)

OTHER PUBLICATIONS

Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.

Rice Jr., M. J. et al., Contract ONR-494(04) ASTIA No. 106967, U.S. Office of Naval Research. 1956. (copy unavailable).

Tskhai, A. N. et al., "The Kinetics and a Mathematical Model of the Isothermal Crystallisation of Aluminum Hydride from Ether-Toluene Solutions," Russian Journal of Inorganic Chemistry, 37(8):877-885. 1992. (copy unavailable).

Brower, F. M. et al., "Preparation and Properties of Aluminum Hydride," Journal of the American Chemical Society, 38(9):2450. Apr. 28, 1976.

(Continued)

*Primary Examiner* — Robert T Butcher
(74) *Attorney, Agent, or Firm* — Carr & Ferrell LLP

(57) ABSTRACT

Systems and methods for producing microcrystalline alpha alane are provided herein. An exemplary process comprises the elimination of the crystallization aid lithium borohydride through the use of excess lithium aluminum hydride or sodium borohydride. Further exemplary processes comprise methods for passivating microcrystalline alpha alane using a weak acid in a nonaqueous solvent solution.

12 Claims, 10 Drawing Sheets

(56) References Cited

U.S. PATENT DOCUMENTS

| | | | |
|---|---|---|---|
| 2007/0161096 A1 | 7/2007 | Mantelatto et al. |
| 2008/0216906 A1 | 9/2008 | Curello et al. |
| 2009/0038954 A1 | 2/2009 | Zidan |
| 2009/0074631 A1 | 3/2009 | Longo |
| 2009/0291045 A1 | 11/2009 | Graetz et al. |
| 2010/0252444 A1 | 10/2010 | Vajo et al. |
| 2012/0017439 A1 | 1/2012 | Yamamoto et al. |
| 2012/0141363 A1 | 6/2012 | Zidan et al. |
| 2016/0115602 A1 | 4/2016 | Crouch-Baker et al. |
| 2016/0297678 A1 | 10/2016 | Stout et al. |
| 2017/0275163 A1 | 9/2017 | Petrie et al. |
| 2018/0155195 A1 | 6/2018 | Stout et al. |

FOREIGN PATENT DOCUMENTS

| | | |
|---|---|---|
| GB | 2281059 A | 2/1995 |
| WO | WO2012018640 A1 | 2/2012 |

OTHER PUBLICATIONS

Bulychev, B. M. et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," Russian Journal of Inorganic Chemistry, 43(5):752-758 and 43:829. (copy unavailable).

Zakharov, V. V. et al. (1992), "The Thermal Transformations of Ether Addition Compounds of Aluminum Hydride," Russian Journal of Inorganic Chemistry, 37(9):997-1005. (copy unavailable).

International Search Report and Written Opinion dated Jan. 17, 2012 in Patent Cooperation Treaty Application No. PCT/US2011/045407, filed Jul. 26, 2011.

Petrie et al., "Synthesis of Microcrystalline Alpha Alane," Utility U.S. Appl. No. 13/671,090, filed Nov. 7, 2012. 16 pages.

Krase et al., "Vapor Pressure of Toluene Up to the Critical Temperature," Industrial and Engineering Chemistry, Jan. 1930, p. 13.

Couper et al., "Process Control," in: Couper et al., "Chemical Process Equipment," Elsevier Inc., 2010, pp. 31-51.

CRYSTALLIZATION AND STABILIZATION IN THE SYNTHESIS OF MICROCRYSTALLINE ALPHA ALANE

CROSS REFERENCE TO RELATED APPLICATIONS

This non-provisional U.S. patent application is a continuation-in-part of and claims the priority benefit of, U.S. patent application Ser. No. 13/671,090 filed on Nov. 7, 2012, now issued as U.S. Pat. No. 9,676,625 granted on Jun. 13, 2017. U.S. patent application Ser. No. 13/671,090 in turn claims priority benefit of provisional U.S. patent application serial number 61/556,738, filed on Nov. 7, 2011. The above applications are hereby incorporated by reference herein in their entirety. This patent application also claims priority benefit of provisional U.S. patent application serial number 62/181,120 filed on Jun. 17, 2015, and provisional U.S. patent application serial number 62/181,129 filed on Jun. 17, 2015, which are hereby incorporated by reference herein in their entirety.

This application is related to U.S. patent application Ser. No. 09/823,379 filed on Mar. 29, 2001, now issued as U.S. Pat. No. 6,617,064 issued Sep. 9, 2003, and entitled "Stabilized Aluminum Hydride Polymorphs". This application is also related to U.S. patent application Ser. No. 09/334,359 filed on Jun. 16, 1999, now issued as U.S. Pat. No. 6,228,338 issued May 8, 2001 and entitled "Preparation of Aluminum Hydride Polymorphs, Particularly Stabilized $\alpha$-$ALH_3$". The disclosures of these patents are hereby incorporated by reference in their entirety.

FIELD OF THE INVENTION

The present technology may be generally described comprising methods for producing microcrystalline alpha alane.

BACKGROUND

Economical production of aluminum hydride ($AlH_3$) or "alane" depends on an approach that combines aluminum with hydrogen in a manner that is energy efficient and practical. However, the rate of direct reaction between pure aluminum and hydrogen is very slow. A major barrier to this reaction is that little change in enthalpic energy ($\Delta H_f = -2.37$ kcal/mol $AlH_3$) occurs in the transformation of elemental aluminum and hydrogen to aluminum hydride. The ordered nature of the crystalline aluminum metal also inhibits reaction with hydrogen. Another barrier is that the aluminum oxide ($Al_2O_3$) coating that forms on the surface of aluminum when it comes in contact with air, reduces or limits the surface area of the reactive aluminum and inhibits the reaction with hydrogen.

Methods for microcrystalline alane synthesis are inefficient for producing large quantities of alane. These methods are problematic when production of a specific alane polymorph is required, such as alpha alane ($\alpha$-alane). The large amounts of solvent required as described in the patent literature for the synthesis of the alpha polymorph of alane hinder the large-scale production of this material by these routes. Material and capital equipment costs can be reduced by a dramatic reduction in solvent for this process.

SUMMARY

Various embodiments of the present disclosure may be directed to a method for producing alpha alane. An exemplary method may comprise adding lithium aluminum hydride to a solvent solution of aluminum trichloride and an ether to produce alane etherate ($AlH_3.Et_2O$) and lithium chloride. The alane etherate may be heated in the presence of an aromatic solvent to obtain microcrystalline alpha alane.

According to additional exemplary embodiments, the present disclosure may be directed to a method for producing alpha alane. An exemplary method may comprise adding lithium aluminum hydride, aluminum trichloride, and an ether to a solvent to form a solvent solution. An excess of lithium aluminum hydride may be added to the solvent solution, the excess lithium aluminum hydride acting as a crystallization aid in the conversion of alane etherate to alpha alane, a preferable alane structural polymorph. The lithium chloride precipitate may be filtered from the alane etherate solution, and at least a portion of the solvent may be removed from the alane etherate solution, forming an alane etherate concentrate. A mixture may be created comprising the alane etherate concentrate, an ether and an aromatic solvent. The mixture may be heated to convert the alane etherate to obtain microcrystalline alpha alane.

According to still further exemplary embodiments, the present disclosure may be directed to a method for producing alpha alane. An exemplary method may comprise adding lithium aluminum hydride, aluminum trichloride, and an ether to a solvent to form a solvent solution. Sodium borohydride may be added to the solvent solution to form lithium borohydride, the lithium borohydride acting as a crystallization aid in the conversion of alane etherate to alpha alane, a preferable alane structural polymorph. The lithium chloride precipitate may be filtered from the alane etherate solution, and at least a portion of the solvent may be removed from the alane etherate solution, forming an alane etherate concentrate. A mixture may be created comprising the alane etherate concentrate, an ether, and an aromatic solvent. The mixture may be heated to convert the alane etherate to obtain microcrystalline alpha alane.

According to yet further exemplary embodiments, the present disclosure may be directed to a method for stabilizing aluminum hydride. An exemplary method may comprise producing aluminum hydride. The aluminum hydride may be placed in a nonaqueous solvent. A weak acid solution may be added to the nonaqueous solvent and the aluminum hydride may be allowed to contact the weak acid solution for a period of time to form passivated aluminum hydride. The passivated aluminum hydride may be separated from the solvent and weak acid solution. The passivated aluminum hydride may be dried.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
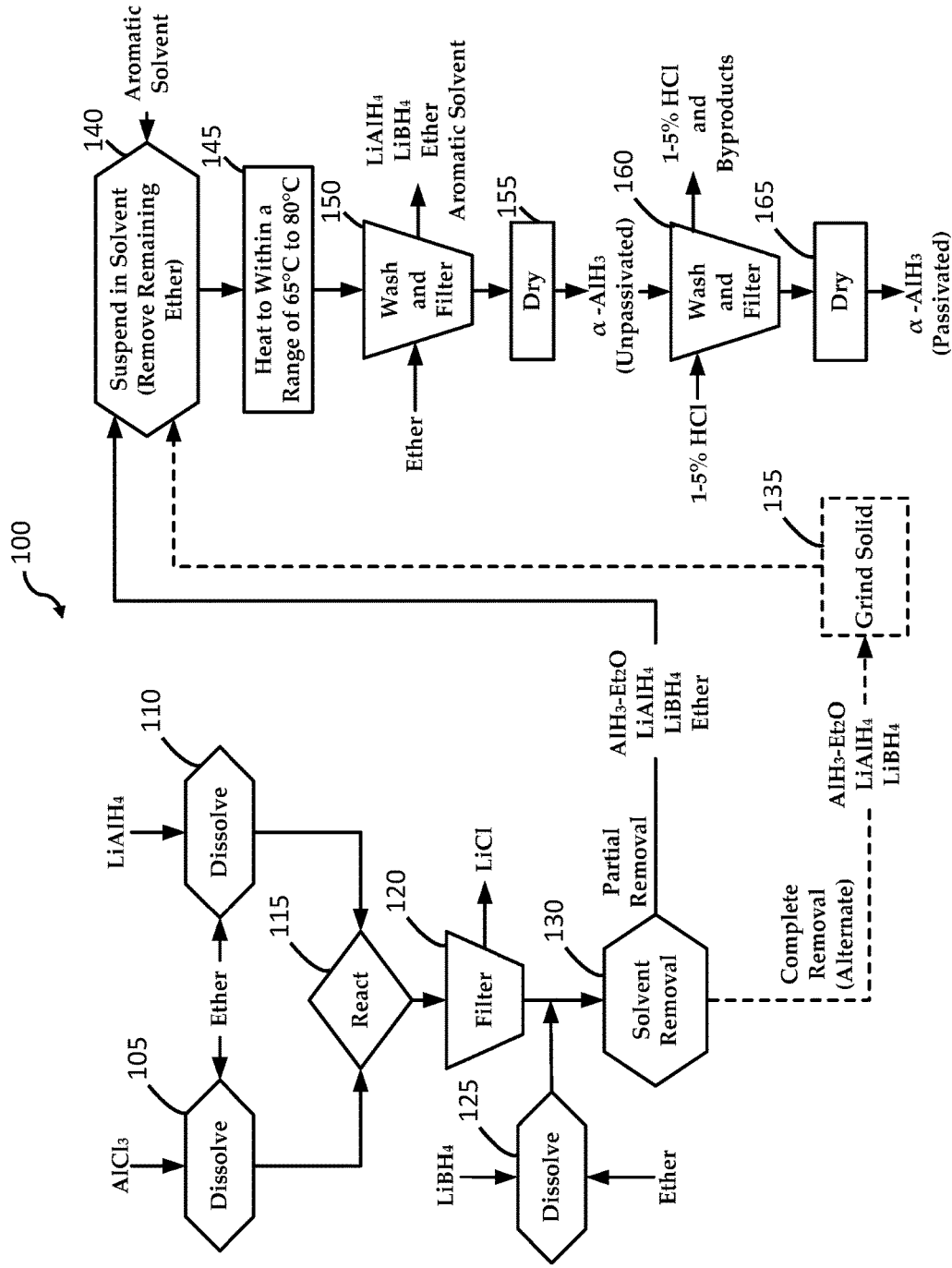
FIG. 1 is a flow diagram of an exemplary process for producing microcrystalline $\alpha$-alane.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Additionally, ranges described or claimed herein are inclusive of their end points. Moreover, the end points are inclusive of suitable fluctuations allowing for reasonable and approximate values that fall near end points.

As used herein, the term "alane" refers to aluminum hydride, having the formula $AlH_3$, and includes all the polymorphs such as α-$AlH_3$, α'-$AlH_3$, δ-$AlH_3$, and the like.

The alpha polymorph of aluminum hydride ($AlH_3$, or alane), also referred to as α-alane, is a stable compound that may be used as a hydrogen source in fuel cells and batteries, among other applications. It may be produced in a 2-stage chemical reaction. In the first stage reaction, alane etherate is created: $AlCl_3 + 3LiAlH_4 + Et_2O \rightarrow 4AlH_3 \cdot Et_2O + 3LiCl$. In the second stage reaction, α-alane is generated by a thermal conversion to drive off the ether adduct to yield a solid form of alane: $AlH_3 \cdot Et_2O \rightarrow$ α-$AlH_3$. While various forms of alane exist, it may be critical to yield the alpha form, as other forms of alane are less stable. The two stages of the reaction must be carried out carefully, or the reactions will yield either just Al metal, or a mixture of $AlH_3$ with Al metal, which is difficult to handle and unstable. Furthermore, substantially pure α-alane is needed to be able to do a later step of passivation so that the alane can be used as a stable fuel source, especially for a fuel cell.

There are a several different methods for producing α-alane. One is a solution process which involves the use of a large volume of solvents. This method produces alane in batches, and is thus an expensive and time-consuming process. Various solvents may be used for carrying out the reaction, such as diethyl ether and toluene. Additionally, hot solvents may be used by various heating methods. Nucleation occurs in this process to facilitate the formation of the alane. Careful control of the stirring method of the material in the reactor, ether content in the reactor, heating profile and heating method, along with use of additives are needed to produce substantially pure α-alane. Other parameters also need to be carefully controlled to effect a proper reaction of materials to generate substantially pure α-alane in a stable form.

Another method for producing α-alane is in a slurry process. To remedy uneven heating and the aforementioned resultant deleterious effects, the solids may be combined with a solvent such as toluene to produce a slurry. When heat is applied to the slurry the solvent allows the heat to be evenly distributed throughout the slurry, reducing the decomposition of the alane etherate precursor into aluminum and alternate alane polymorphs.

In the slurry process, the materials in the reactor are much more highly concentrated, and thus significantly less solvent is needed to carry out the reactions to completion. This allows for production of large quantities of microcrystalline alane at reduced material and capital costs. Alane is still produced in batches. The heating methods and heating profile of this process must also be carefully controlled, along with stirring method, ether content, and other parameters. Nucleation occurs in this process to facilitate the formation of the alane. Precipitation aids and methods may also be employed to facilitate the production of the α-alane, along with crystallization aids. Passivation methods may further be employed to produce a stable form of the α-alane. The microcrystalline form of α-alane comprises an enhanced surface area, which provides for enhanced reactivity of the alane. This enhanced reactivity may be reduced via passivation.

Passivation may occur by introducing the microcrystals into a non-aqueous solvent such as toluene. In some instances, the slurry of microcrystals and non-aqueous solvent may be combined into a low concentration acidic solution such as between 1 to 5% hydrochloric acid. The microcrystals may also be added directly to the acid solution. This process passivates the surface of the microcrystals by creating an aluminum oxide coating on the surface of the alane. Also, the hydrochloric acid destroys more reactive alane polymorphs as well as residual lithium borohydride and lithium aluminum hydride. Passivated alane is safer to handle than the more reactive alane. Additionally, passivated alane has a longer shelf life compared to un-passivated alane that also can contain impurities that can catalyze the decomposition of the alane and are highly reactive to water and ambient air.

A third method for producing α-alane is in a continuous process. In this process, one or both stages of the reactions for producing α-alane may occur in a continuous flow reactor as opposed to a batch reactor. This allows for faster production of the alane along with fewer raw materials to be used (i.e., not as much solvent needed).

A continuous process for producing α-alane may allow for two-stage passivation. Similar to the solution process and the slurry process, careful control of heating methods and heat profile are needed in the reactor, along with other parameters. Various methods for removing ether from the process may be employed.

A fourth method of producing α-alane is in an electrochemical cell. In this method, an electric field is applied across a solution, causing the positive ions to move toward the negative side of the field and the negative ions to move toward the positive side. The two half-cells of an electrochemical cell are connected by a cell separator that allows ions to move between the half-cells but prevents mixing of the electrolytes. The separator may be a membrane, to selectively allow certain compounds to pass between sides.

In a typical electrochemical cell used to produce alane etherate, the rate of alane production is limited by the current flow through the cell.

Generally speaking, various embodiments may comprise systems and processes for synthesizing microcrystalline alane, preferably the alpha polymorph (α-alane). In some embodiments, exemplary processes may comprise combining excess lithium aluminum hydride (LiAlH$_4$) with an amount of aluminum trichloride (AlCl$_3$) in an ether solvent to produce lithium aluminum hydride, lithium chloride, and alane etherate. Next, the lithium chloride may be separated by filtration leaving a composition of ether, alane etherate and lithium aluminum hydride. This mixture may be further processed to remove ether, and the resulting solid may be heated to separate the alane from the alane etherate.

It is noteworthy that alane etherate is sensitive to temperature. Thus, uneven or incomplete heating may result in the decomposition of alane etherate into aluminum and hydrogen gas, which produces a potentially flammable product. Additionally, heating may cause the alane etherate to transform into various polymorphs. The transformation of alane into its various polymorphs is undesirable when α-alane synthesis is the desired goal.

To remedy uneven heating and the aforementioned resultant deleterious effects, the solids may be combined with a solvent such as toluene to produce a slurry. When heat is applied to the slurry the toluene allows the heat to be evenly distributed throughout the slurry, reducing the decomposition of alane etherate into aluminum and alternate polymorphs.

Production of α-Alane

FIG. 1 is a flow diagram of an exemplary process 100 used for alane synthesis according to various embodiments. At steps 105 and 110, the synthesis involves the addition of a solution of aluminum trichloride (AlCl$_3$) to lithium aluminum hydride (LiAlH$_4$) in an ether, such as diethyl ether, to generate at step 115 alane etherate (AlH$_3$.Et$_2$O) in solution and lithium chloride precipitate. The solubility of alane etherate has an inverse relationship to temperature, and keeping the reaction temperature to within a range of approximately −5° C. to 0° C. reduced the observed premature crystallization at ambient temperature. The concentration of the AlH$_3$.Et$_2$O was approximately 0.8 M during filtration at step 120.

Following filtration at step 120, a solution of lithium borohydride (LiBH$_4$) dissolved in 1.0 M of diethyl ether (step 125) is added to the filtered mixture. The LiBH$_4$ may act as an optionally added crystallization aid by improving the size and shape of the alane crystals. The next step involves the removal of most of the diethyl ether solvent by vacuum distillation at step 130. After removal of approximately all visible solvent and pumping under high vacuum for an additional period of time (which in some instances may range from approximately two to three hours), the remaining solid material of approximate composition LiAlH$_4$/4AlH$_3$.1.2Et$_2$O/LiBH$_4$ may be a bright white powder material. This solid material may be ground at step 135 and transferred into a separate flask for heating. Several separate experiments were preformed where only 70-95% of the diethyl ether was removed (indicated as "Partial Removal" in FIG. 1) giving a slurry of the LiAlH$_4$/4AlH$_3$.Et$_2$O/LiBH$_4$ mixture in a minimal amount of diethyl ether.

At step 145, heating of this solid mixture to a temperature that falls within a range of approximately 60° C. to 65° C. for a period of time of approximately four hours and in the presence of a vacuum, converts the alane etherate into α-alane and other products.

Empirical data suggests that heating of the solid mixture resulted in uneven heating, which leads to mixtures of products being formed. As mentioned above, uneven heating may result in decomposition of the alane etherate into aluminum and hydrogen gas, as well as the formation of various alternate alane polymorphs.

Thus, the process 100 may include a step of combining the solid (from step 135) or diethyl ether slurry mixture (from step 130) with an aromatic solvent such as toluene (C$_7$H$_8$) at step 140 prior to heating at step 145. Other aromatic solvents such as benzene, ethylbenzene, xylene and mixed xylenes, naphthas, and mixtures thereof may also be used. The aromatic solvent may act as a heat sink and more optimal distribution of solids throughout the solvent may allow for better distribution of heat throughout the sample. Advantageously, even distribution of heat during the heating cycle may provide efficient transformation of the alane etherate into α-alane thereby avoiding the generation of hot spots, which can degrade the alane etherate precursor.

According to some embodiments, the slurry may be heated to a temperature that falls within a range of approximately 72° C. to 80° C., over a period of time of approximately three to six hours. During the heating process alane etherate may be transformed into α-alane. Heating at lower temperatures may result in the decomposition of alane etherate and the generation of alternate alane polymorphs. It will be understood that as the temperature increases, the length of the heating cycle may decrease. The temperature employed in this process is approximately 20° C. lower than used for known methods of producing microcrystalline α-alane, thus significantly reducing energy costs of alane production.

After heating, the solid may be rinsed with an ether, such as diethyl ether, at step 150 which may dissolve the more soluble excess lithium aluminum hydride and lithium borohydride. These crystallization aides may be reused in subsequent batches of alane production. Rinsing and filtering of remaining lithium borohydride and lithium aluminum hydride from the toluene slurry, and subsequent drying at step 155, may provide α-alane in microcrystal form.

The microcrystal form of α-alane, comprises an enhanced surface area, which provides for enhanced reactivity of the alane. This enhanced reactivity may be reduced via passivation.

Passivation may occur by introducing the microcrystals into a non-aqueous solvent such as dimethoxyethane or toluene prior to the addition of the aqueous acid. This may result in distributing the heat generated during the passivation process. In some instances, the slurry of microcrystals and non-aqueous solvent may be combined into a low concentration mineral acid solution such as between 1 to 5% hydrochloric acid at step 160. Other mineral acids or buffered solutions of these acids may also be used in the passivation step, such as phosphoric acid (H$_3$PO$_4$), sulfuric acid (H$_2$SO$_4$), boric acid (H$_3$BO$_3$), hydrofluoric acid (HF), hydrobromic acid (HBr), hydroiodic acid (HI), and mixtures thereof.

The microcrystals may also be added directly to the acid solution. After washing and filtering at step 160, the microcrystals may be dried at step 165 producing the passivated α-alane final product. This process may passivate the surface of the microcrystals by creating an aluminum oxide coating on the surface of the alane. Also, the acid may passivate or destroy more reactive alane polymorphs as well as any aluminum metal, residual lithium borohydride and lithium aluminum hydride. Passivated alane is safer to handle than the more reactive alane. Additionally, passivated alane has a longer shelf life compared to un-passivated alane that also can contain impurities that are highly reactive to water and ambient air.

Figure 10:
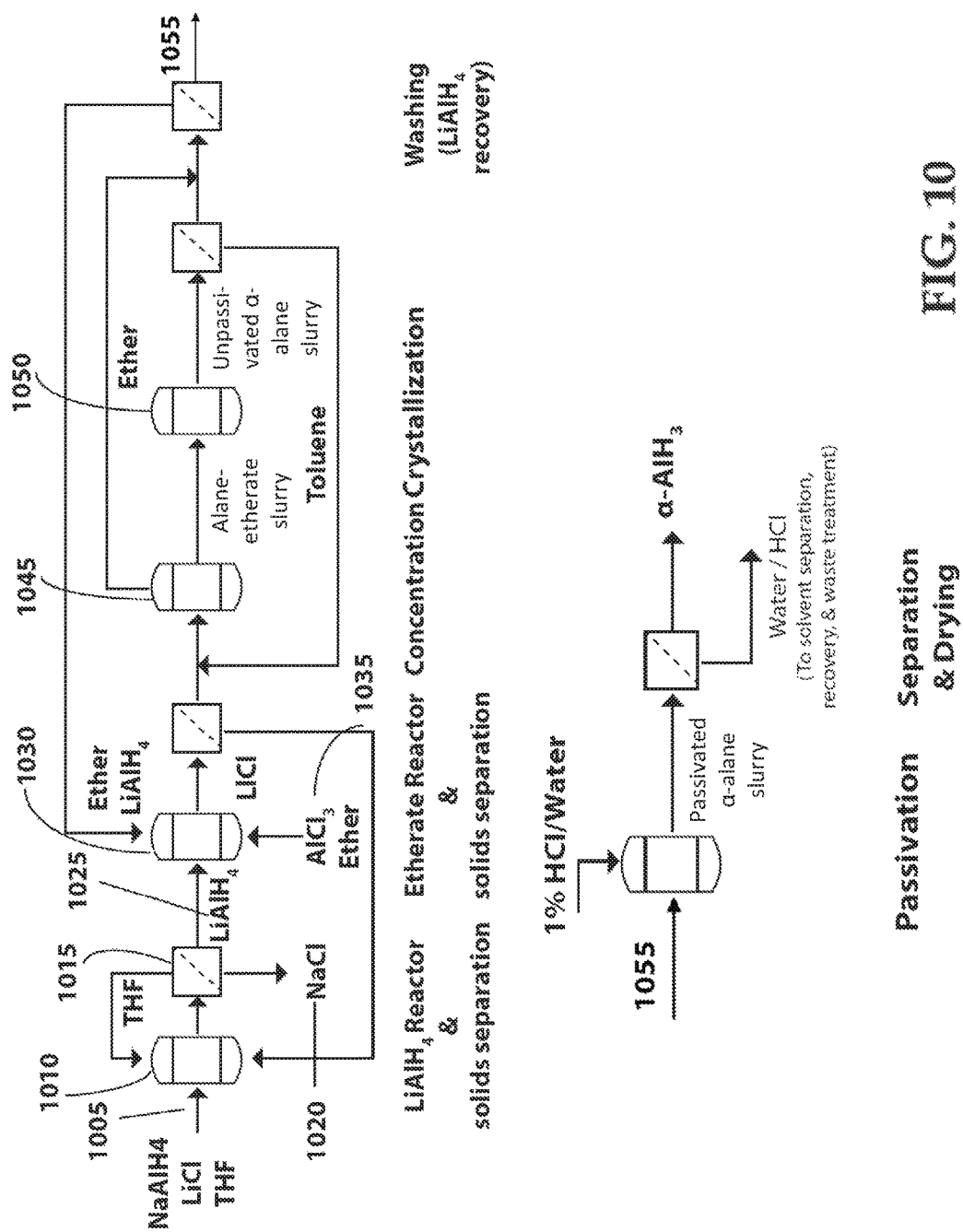
FIG. 10 is a flow diagram of an exemplary process for producing microcrystalline α-alane.

FIG. 10 is a flow diagram of an exemplary process used for alane synthesis according to various embodiments. The process may be a continuous flow production process, composed of three reactors. In the first reactor (also referred to as a LiAlH$_4$ reactor 1010), AlH$_4$, LiCl and THF are fed into the reactor via stream 1005. It should be noted that even though the figure only depicts these components and streams, other materials may be also be present in the reactor or the process. From the LiAlH$_4$ reactor, solids are separated in separator 1015, and NaCl and LiAlH$_4$ are generated in streams 1020 and 1025, respectively.

The generated LiAlH$_4$ stream 1025 may be fed into an etherate reactor 1030 with AlCl$_3$ and ether via stream 1035 to generate LiCl. Again, while FIG. 10 only depicts certain components for simplicity, other materials may also be present at any step of the process. A primary reaction in the etherate reactor is: AlCl3+LiAlH4+Et2O→AlH$_3$.Et$_2$O. The resulting materials can be concentrated and fed into a crystallization reactor via processes 1045 and 1050. A primary reaction in the crystallization reactor 1050 is: AlH$_3$.Et$_2$O→α-AlH$_3$. The α-AlH$_3$ product may be subsequently washed, passivated (from stream 1055), separated and dried as depicted in FIG. 10.

Elimination of Lithium Borohydride Crystallization Aid

A significant portion of the cost associated with producing α-alane is the addition of a crystallization aid, which is a material in the solution to facilitate the crystallization from alane etherate to α-alane in the second stage reaction. When the crystallization process occurs in a slurry instead of in a solution, the reactor can be much smaller. Typically, lithium borohydride is used as a crystallization aid, which is added to the reactor after alane etherate is formed (see step 125 of FIG. 1). The lithium borohydride improves the crystallinity of the resulting alpha alane product.

Figure 2:
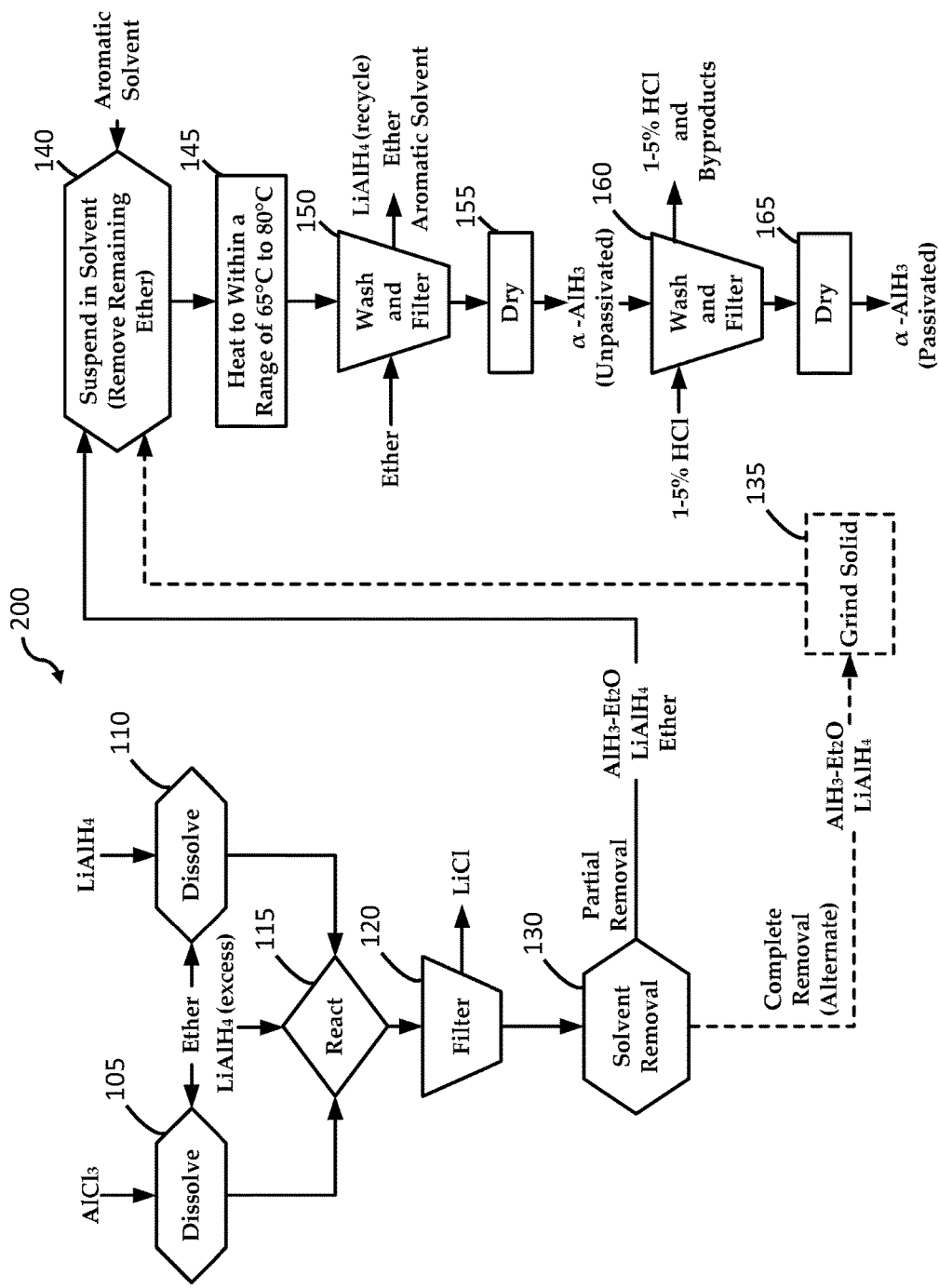
FIG. 2 is a flow diagram of an exemplary process for producing microcrystalline $\alpha$-alane.

In various embodiments of the solution process as illustrated in an exemplary process 200 in FIG. 2, excess lithium aluminum hydride can be added to the reactor at step 115, which is then carried along from the first reaction into the second reaction and essentially acts as the crystallization aid in the second reaction. In this way, one can avoid the necessity of adding lithium borohydride for the crystallization process of producing aluminum hydride (note that step 125 of FIG. 1 has been eliminated from FIG. 2). This is useful because elimination of lithium borohydride from the process allows more efficient recycling of the lithium aluminum hydride. An additional benefit is the removal of the expensive lithium borohydride from the crystallization process.

In further embodiments, lithium aluminum hydride can be generated from sodium aluminum hydride in a process similar to that depicted in the LiAlH$_4$ reactor of FIG. 10. This is advantageous since sodium aluminum hydride is a less costly material than lithium aluminum hydride.

Additionally, in various embodiments utilizing a slurry process may be performed without a crystallization aid. Essentially a solution process type chemistry can be utilized, but in a slurry process. Excess lithium aluminum hydride may be utilized alone as a method of converting alane etherate into alane. The excess lithium aluminum hydride may be added directly, or generated from sodium aluminum hydride first, in a process similar to the LiAlH$_4$ reactor depicted in FIG. 10.

Figure 3:
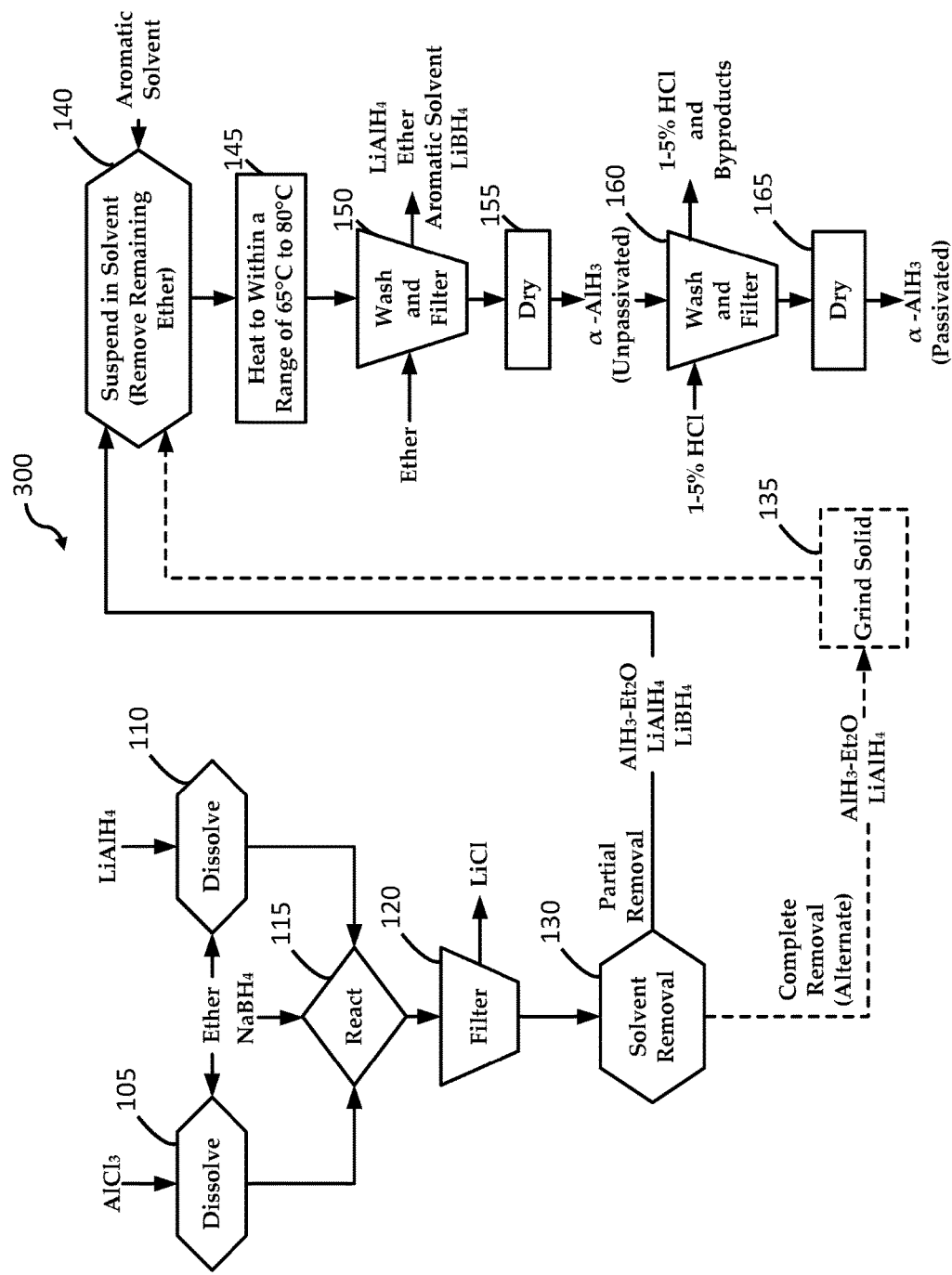
FIG. 3 is a flow diagram of an exemplary process for producing microcrystalline $\alpha$-alane.

In further embodiments as illustrated in an exemplary process 300 in FIG. 3, instead of adding lithium borohydride after alane etherate is formed in the reactor, sodium borohydride (NaBH$_4$) may be added to the reactor for the first reaction at step 115 to generate the lithium borohydride in the reactor in situ. In the presence of lithium chloride, the sodium borohydride undergoes a cation exchange reaction to the lithium borohydride. Thus, lithium borohydride may be present in the reactor to act as a crystallization aid without having to add it directly. This may reduce the raw material cost to that of the sodium borohydride instead of lithium borohydride, which is significantly more economical. This allows for a more economical larger scale production of α-alane.

Aluminum Hydride Stabilization

The terms "stabilized" or "stabilization" when used to refer to the α-alane product indicates that the product is substantially more stable than α-alane products of the prior art (i.e., α-alane prepared without the use of an acid wash workup and/or without stabilizing agents as disclosed herein). That is, "unstabilized" α-alane may rapidly decompose to hydrogen and aluminum, while the stabilized α-alane of the invention does not. "Stability" refers to both thermal stability and stability at ambient temperature. With respect to thermal stability, the "stabilized" α-alane of the invention may be less than 1% decomposed after twelve days at 60° C., while decomposition of the unstabilized product at that point may be virtually complete.

Regardless of which method is employed for the synthesis of aluminum hydride, it may be advantageous to stabilize the aluminum hydride because it is particularly susceptible to decomposition when exposed to air and/or water. The microcrystal form of α-alane, such as that produced in the slurry process, comprises an enhanced surface area, which may be 3-5 times greater than non-microcrystalline α-alane. The increased surface area may result in enhanced reactivity of the alane. This enhanced reactivity may be reduced via passivation. Passivated alane is safer to handle than the more reactive unpassivated alane. Additionally, passivated alane has a longer shelf life compared to un-passivated alane that also can contain impurities that are highly reactive to water and ambient air.

Figure 4:
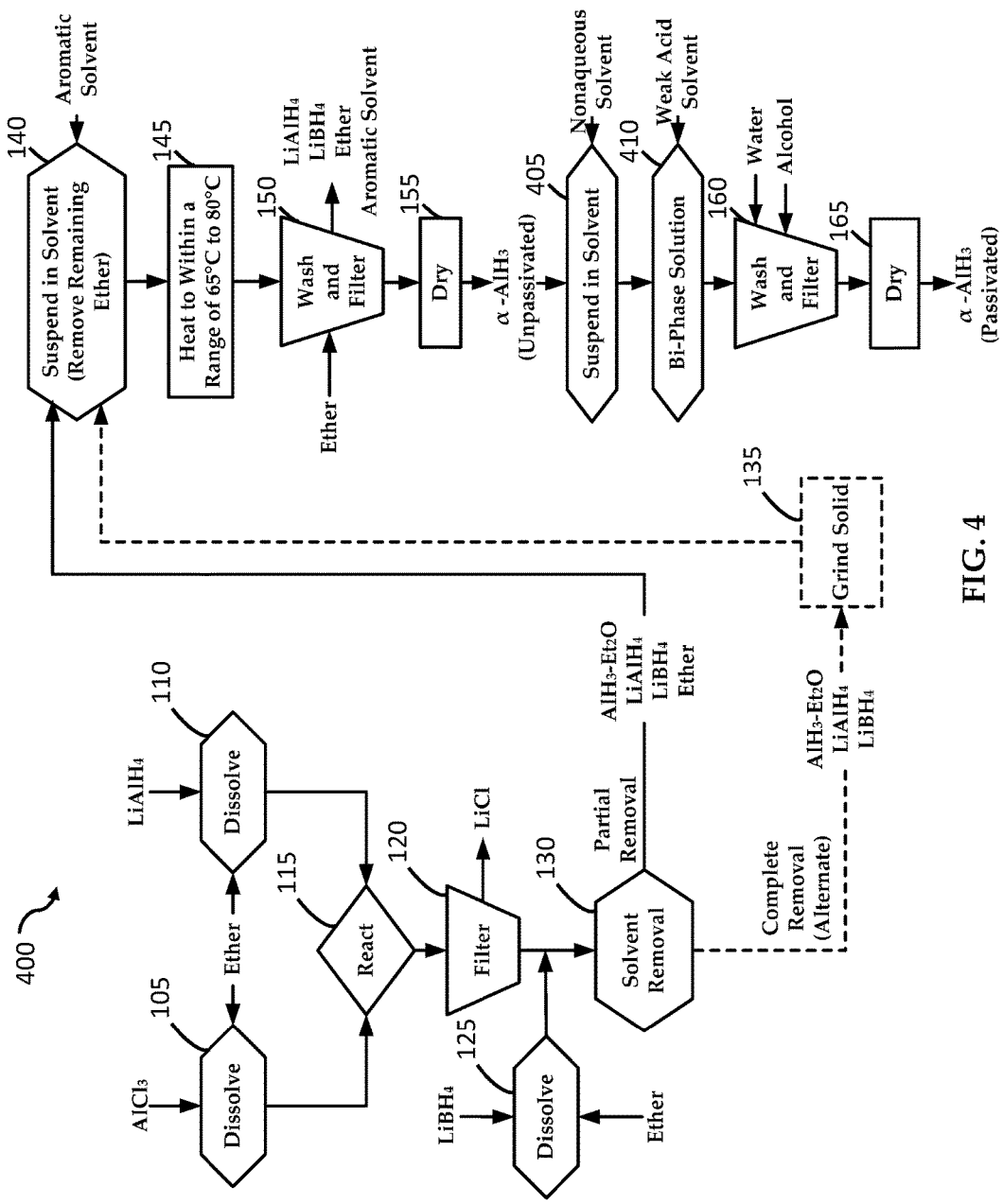
FIG. 4 is a flow diagram of an exemplary process for producing microcrystalline $\alpha$-alane.

The passivation step in FIG. 1 (step 160) may utilize a hydrochloric acid solution. However, hydrochloric acid may be too aggressive when microcrystals of aluminum hydride are produced, leading to breakdown of the alpha polymorph. Thus, as illustrated in FIG. 4, a method 400 may comprise stabilizing the aluminum hydride by placing the aluminum hydride in a nonaqueous solvent and then adding a weak acid solution of generally 1-5% (see steps 405-410 followed by steps 160-165 of FIG. 4). In some embodiments, the aluminum hydride may be combined with a nonaqueous solvent such as diethyl ether or toluene at step 405 to prevent decomposition. Any nonaqueous solvent, such as aromatic or hydrocarbon solvents and mixtures thereof may be suitable for this step.

The passivation process, which converts a portion of the aluminum hydride to an aluminum oxide coating on the surface of the aluminum hydride crystals, is highly exothermic. The rate of this reaction increases with increasing temperature, so control of the heat generated during the passivation reaction may be necessary to prevent an excessive amount of aluminum hydride (the desired product) to be consumed. In step 405, the nonaqueous solvent may act as a heat sink to moderate the reaction temperature and to maintain a desired reaction rate for passivation.

At step 410, the weak acid solution may be added to the solvent-aluminum hydride suspension, forming a bi-phasic or mono-phasic solution. In various embodiments, the weak acid solution may comprise an acid that is weaker than hydrochloric acid. One measure of acid strength is the acid's dissociation constant ($K_a$). Thus, an acceptable weak acid may be an acid with a $K_a$ value less than that of hydrochloric acid. Another measure of acid strength is whether it partially or fully dissociates in water. According to this measure, an acceptable weak acid may be an acid that only partially dissociated in water. Non-limiting examples of weak acids comprise chloroacetic acid, lactic acid, maleic acid, malonic acid, nitrous acid, oxalic acid, periodic acid, phosphoric acid, phosphorous acid, o-phthalic acid, salicylic acid, sulfurous acid, tartaric acid, and mixtures thereof.

At step 160, the bi-phasic solution may be filtered to remove the solid aluminum hydride from the solution, then washed with water to remove residual solvent and acid. The aluminum hydride may then be washed with an alcohol to remove residual water and allow more efficient drying. The aluminum hydride may then be dried at step 165. The drying process may comprise heating the aluminum hydride at atmospheric pressure, or under vacuum.

Figure 5:
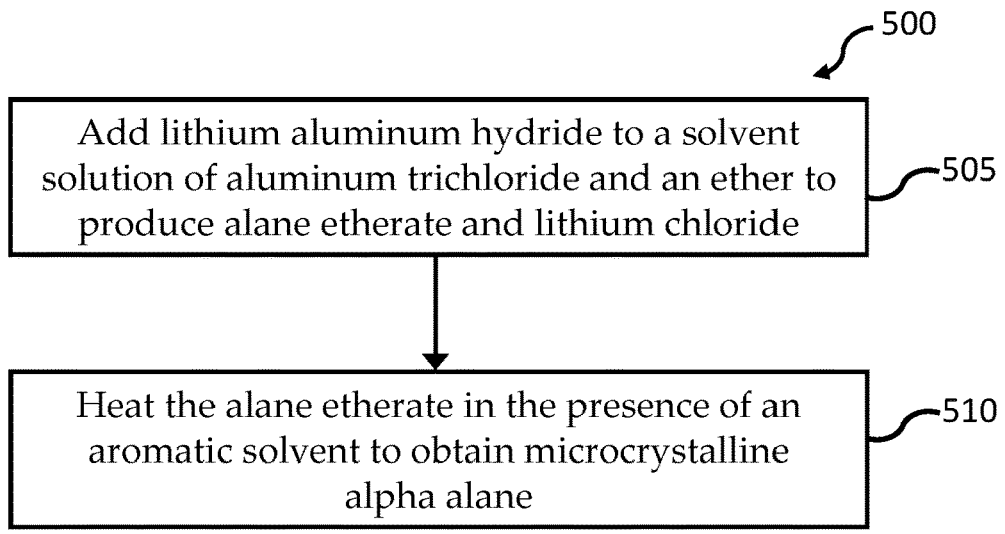
FIG. 5 is a flow diagram of an exemplary method for producing microcrystalline α-alane.

FIG. 5 is a flowchart of an exemplary method 500 for producing alpha alane according to various embodiments. At step 505, lithium aluminum hydride may be added to a solvent solution of aluminum trichloride and an ether to produce alane etherate and lithium chloride. The alane etherate may be heated at step 510 in the presence of an aromatic solvent to obtain microcrystalline alpha alane.

Figure 6:
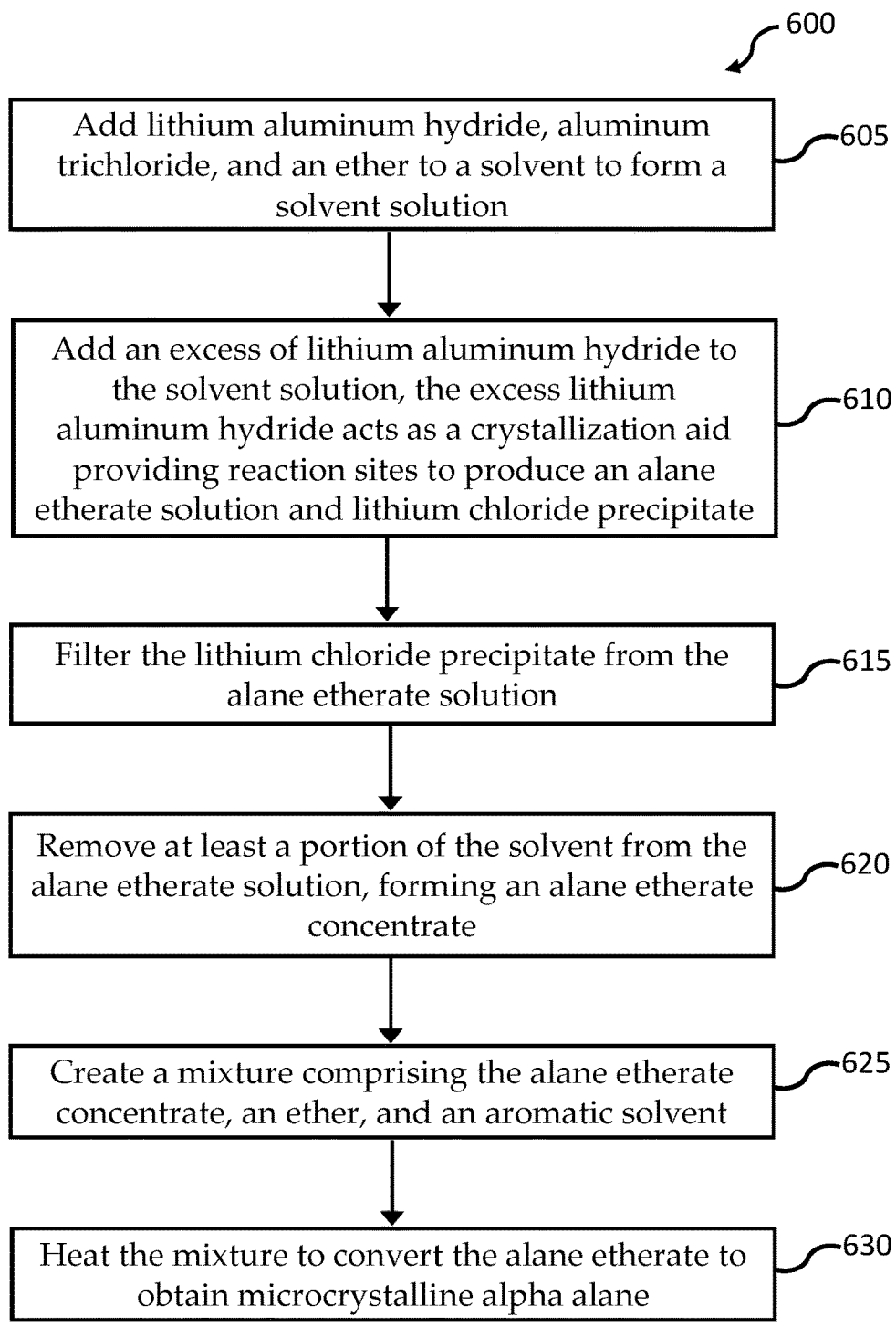
FIG. 6 is a flow diagram of an exemplary method for producing microcrystalline α-alane.

FIG. 6 is a flowchart of an exemplary method 600 for producing alpha alane according to various embodiments. Lithium aluminum hydride, aluminum trichloride, and an ether may be added to a solvent to form a solvent solution at step 605. At step 610, an excess of lithium aluminum hydride may be added to the solvent solution. The excess lithium aluminum hydride facilitates the transformation of the alane etherate to alpha alane in the heating step. The lithium chloride precipitate may be filtered at step 615 from the alane etherate solution, and at least a portion of the solvent may be removed from the alane etherate solution at step 620, forming an alane etherate concentrate. At step 625 a mixture may be created comprising the alane etherate concentrate, an ether and an aromatic solvent. The mixture may be heated to convert the alane etherate to obtain microcrystalline alpha alane at step 630.

Figure 7:
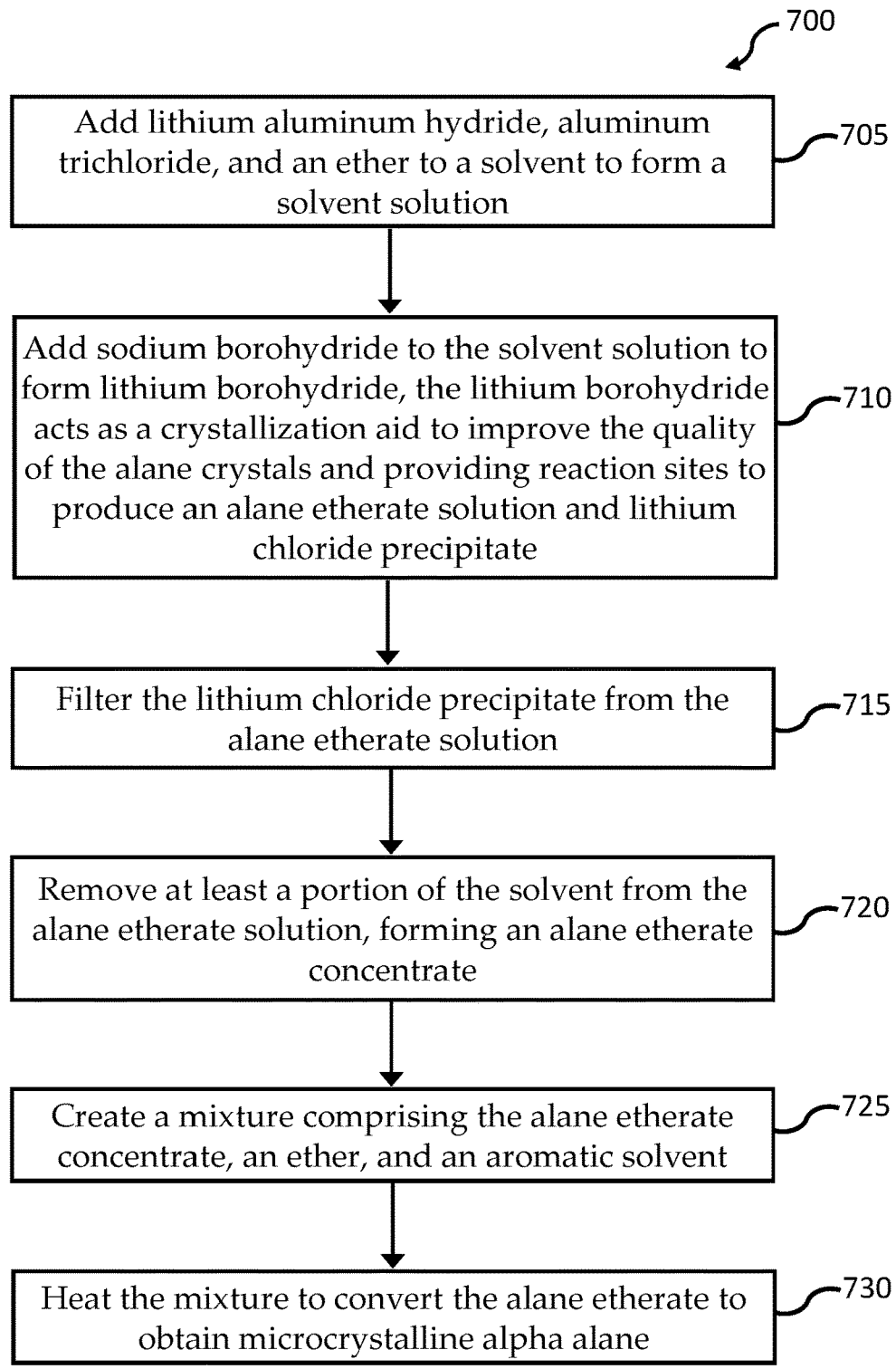
FIG. 7 is a flow diagram of an exemplary method for producing microcrystalline α-alane.

FIG. 7 is a flowchart of an exemplary method 700 for producing alpha alane according to various embodiments. At step 705, lithium aluminum hydride, aluminum trichloride, and an ether may be added to a solvent to form a solvent solution. Sodium borohydride may be added to the solvent solution at step 710 to form lithium borohydride. The lithium borohydride improves the crystallinity of the resulting alpha alane product. At step 715, the lithium chloride precipitate may be filtered from the alane etherate solution, and at least a portion of the solvent may be removed from the alane etherate solution at step 720, forming an alane etherate concentrate. A mixture may be created at step 725 comprising the alane etherate concentrate, an ether and an aromatic solvent. The mixture may be heated to convert the alane etherate to obtain microcrystalline alpha alane at step 730.

Figure 8:
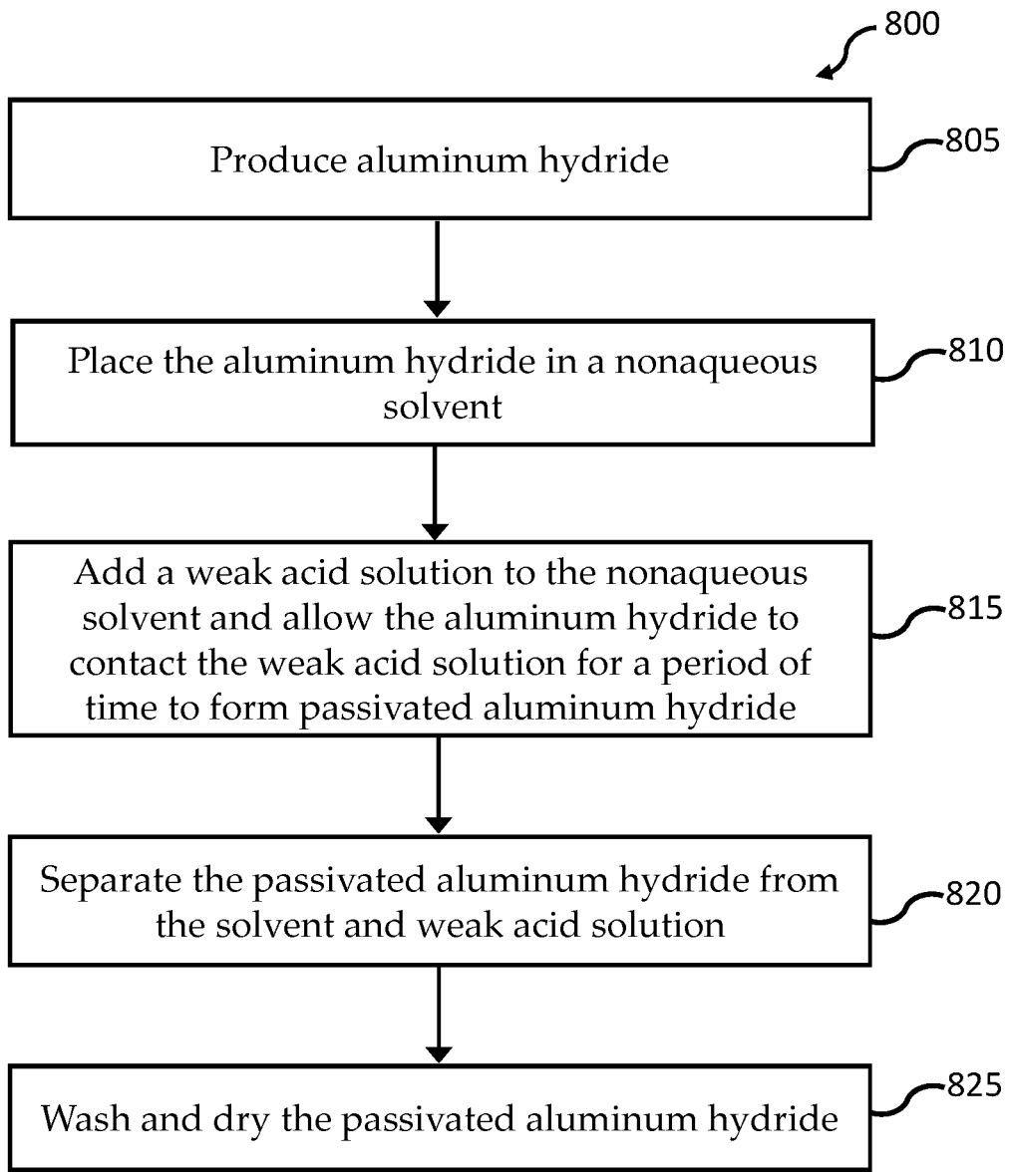
FIG. 8 is a flow diagram of an exemplary method for stabilizing aluminum hydride

FIG. 8 is a flowchart of an exemplary method 800 for stabilizing aluminum hydride according to various embodiments. At step 805, aluminum hydride may be produced.

The aluminum hydride may be placed in a nonaqueous solvent at step 810. At step 815, a weak acid solution may be added to the nonaqueous solvent and the aluminum hydride may be allowed to contact the weak acid solution for a period of time to form passivated aluminum hydride. The passivated aluminum hydride may be separated from the solvent and weak acid solution at step 820. The passivated aluminum hydride may be washed and then dried at step 825.

EXAMPLES

Processes described herein may use dramatically lower amounts of solvent compared to the current route used for synthesis of microcrystalline α-alane. Alane synthesis experiments described in greater detail herein were designed to provide more information on the route to microcrystalline α-alane. Several parameters such as temperature, time, solvent and concentration were varied to investigate their effect on the process.

The highest purity starting materials were utilized in these experiments and included: (1) lithium aluminum hydride in 1.0 M diethyl ether; (2) aluminum chloride, 99.99%; and (3) lithium borohydride, 99.5%, combined together in a solvent such as diethyl ether. The diethyl ether is dried from sodium metal. Toluene may be dried over molecular sieves.

Example 1

Alane Synthesis (20-g Batch)

This batch used a single pot 20-g scale-up reactor apparatus. The apparatus enabled rapid filtration of alane etherate solutions, more efficient temperature control, and the ability to work at a higher solvent load (approximately 1.2 L) required for the 20-g scale. The safety of the synthesis procedure was also greatly improved. For example, methods that use unevenly distributed heating methods may produce decomposed alane, which results in reactive aluminum and hydrogen gas, which are volatile materials.

The lithium aluminum hydride used for this procedure included purified 95% material. The solid from the dry box was loaded into a 1 L flask and dissolved using approximately 800 mL of diethyl ether. This mixture was then transferred into a 2 L jacketed reactor assembly. The solution was stirred by an overhead stirrer and cooled to approximately −8° C. using a recirculating bath unit. The aluminum chloride (approximately 26.6 g) was dissolved in approximately 200 mL of diethyl ether. This mixture was then added into the reactor over a time frame of approximately five minutes and combined with the cooled lithium aluminum hydride solution. Lithium chloride precipitate appeared immediately and settled rapidly when stirring terminates.

Immediately after addition the solution was filtered into a flask under the reactor over approximately five minutes time. The flask containing the clear filtrate was then disconnected from the reactor unit and approximately 4.34 g of lithium borohydride, which had been pre-dissolved in approximately 350 mL of diethyl ether was added into the reactor. The diethyl ether was removed via trap-to-trap distillation under vacuum. Any remaining solvent was removed under dynamic vacuum of approximately 0.02 torr for a period of time of approximately seventeen hours.

The final mass of the resultant α-alane after transfer and fine grinding was approximately 52.8 g. A 13 g portion of this material was heated at 71° C. for approximately six hours as a stirred suspension in toluene (35 mL), which resulted in a light grey powder after filtration and rinsed three times with 150 mL of diethyl ether each time.

Figure 9:
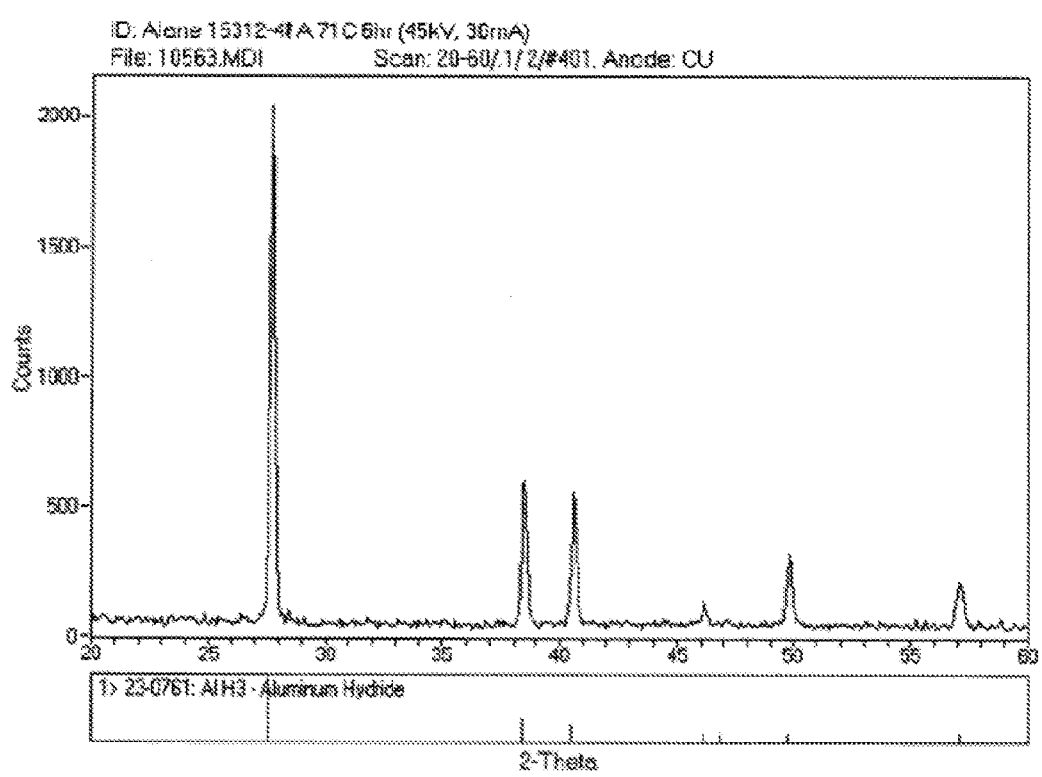
FIG. 9 illustrates an x-ray diffraction analysis of a microcrystalline α-alane product produced by the process of FIG. 1.

FIG. 9 illustrates an x-ray diffraction analysis showing all α-alane with no evidence of other alane polymorphs or aluminum metal. Thus, heating of the lithium aluminum hydride, alane etherate, and lithium borohydride mixtures as toluene slurries at a temperature of approximately 71° C. transforms the initially formed γ-alane into the alpha phase with no evidence of resultant aluminum metal.

Example 2

Alane Synthesis (20-g Batch)

This reaction was performed following the above described procedure and apparatus, and produced approximately 20-g batches of α-alane. A 1.0 M lithium aluminum hydride solution was used. The final mass after the reaction, solvent removal, drying phase, and fine grinding was approximately 53.3 g. This material was heated to approximately 71.4° C. for approximately six hours in toluene and gave a light-grey powder after rinsing three times in 300 mL of diethyl ether and drying on a glass filter frit. The yield of non-passivated material was approximately 22.5 g. X-ray diffraction analysis showed all α-alane with no evidence of other polymorphs or aluminum metal in the mixture. Differential scanning calorimetry (DSC) and thermogravimetric analysis (TGA) both show an aliquot of the non-passivated material, which shows a single endothermic DSC peak at approximately 169° C. and a weight loss of approximately 8.8% starting at 151° C.

Example 3

Alane Synthesis (Heating in Minimal Diethyl Ether/Toluene)

This method demonstrates that taking the diethyl ether to dryness and grinding the solid is not required for successful transformation to high quality microcrystalline α-alane. This reaction was performed following the above described procedure and apparatus, and produced approximately 20-g batches of α-alane. A 1.0 M lithium aluminum hydride solution was used. Approximately one quarter of the diethyl ether solution of $LiAlH_4/4AlH_3.Et_2O/LiBH_4$ was separated and reduced in volume under vacuum to remove ~75-90% of the diethyl ether. The diethyl ether slurry was combined with ~110 ml of toluene. This slurry was subjected to a slight vacuum at ambient temperature (20-25° C.) to remove most of the remaining diethyl ether. After heating the solid mixture in mostly toluene at ~75° C. over 5 hours, the grey solid was rinsed three times with 50 mL of diethyl ether and dried under vacuum. The un-passivated grey solid weighed ~6.0 g. In order to passivate the α-alane for long term stability, the material was poured directly into a 1% hydrochloric acid solution. Sparks or evolution of hydrogen were not observed during the addition. The acid slurry was stirred ~2 min and the grey solid isolated by filtration and washed with water and ethanol and air-dried. Yield was ~5.3 g of a light grey solid. X-ray diffraction analysis of the passivated solid showed all α-alane with no evidence of other polymorphs or aluminum metal in the mixture. Differential scanning calorimetry (DSC) and thermogravimetric analysis (TGA) both show that the passivated material, gives a single endothermic DSC peak at approximately 168° C. and a weight loss of approximately 9.3% starting at 150° C.

Removing the diethyl ether to a minimal level while maintaining a diethyl ether slurry of the solid $LiAlH_4/4AlH_3.Et_2O/LiBH_4$ mixture allows ease of transfer of the solution on an industrial scale and removes the need to grind the solid mixture as described in the previous experimental descriptions.

Allowing a portion of the diethyl ether solvent to remain during the heating phase in toluene results in more control over particle size distribution, ease of passivation and higher hydrogen content of the microcrystalline alpha alane.

The flowcharts and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for producing alpha alane, comprising:
   in a first chemical reaction, reacting an excess amount of lithium aluminum hydride with aluminum trichloride, and an ether with a first solvent to produce an alane etherate solution comprising alane etherate and an excess portion of the lithium aluminum hydride not consumed in the first chemical reaction, wherein the excess portion of the lithium aluminum hydride acts as a crystallization aid providing reaction sites to produce an alane etherate solution in a second chemical reaction;
   removing at least a portion of the first solvent from the alane etherate solution, forming an alane etherate concentrate comprising the alane etherate and the excess portion of the lithium aluminum hydride;
   after the removing at least a portion of the first solvent from the alane etherate solution to form the alane etherate concentrate, suspending the alane etherate concentrate in an aromatic solvent; and
   heating the suspension to convert the alane etherate concentrate to microcrystalline alpha alane in the second chemical reaction, wherein the crystallization of the alane etherate concentrate to the microcrystalline alpha alane is aided by the excess portion of the lithium aluminum hydride carried over from the first chemical reaction.

2. The method of claim 1, wherein the alane etherate solution further comprises lithium chloride precipitate, and the method further comprises filtering the lithium chloride precipitate from the alane etherate solution prior to removing the portion of solvent from the alane etherate solution to form the alane etherate concentrate.

3. The method of claim 1, wherein the producing the alane etherate solution occurs at a temperature of approximately −5° C. to 0° C.

4. The method of claim 1, wherein the heating the suspension comprises heating the suspension to a temperature of approximately 65° C. to 80° C.

5. The method of claim 1, wherein the first solvent comprises an aromatic solvent, a hydrocarbon solvent, or a mixture thereof.

6. The method of claim 5, wherein the first solvent comprises toluene.

7. A method for producing alpha alane, comprising:
in a first chemical reaction, reacting lithium aluminum hydride with aluminum trichloride ether, and a first solvent and sodium borohydride to produce an alane etherate solution comprising alane etherate, lithium aluminum hydride, and lithium borohydride, wherein the lithium borohydride acts as a crystallization aid providing reaction sites to produce an alane etherate solution in a second chemical reaction;
removing at least a portion of the first solvent from the alane etherate solution, forming an alane etherate concentrate comprising the alane etherate, the lithium aluminum hydride, and the lithium borohydride;
after the removing at least a portion of the first solvent from the alane etherate solution to form the alane etherate concentrate, suspending the alane etherate concentrate in an aromatic solvent; and
heating the suspension to convert the alane etherate concentrate to microcrystalline alpha alane in the second chemical reaction, wherein the crystallization of the alane etherate concentrate to the microcrystalline alpha alane is aided by the lithium borohydride produced in the first chemical reaction and carried over to the second chemical reaction.

8. The method of claim 7, wherein the alane etherate solution further comprises lithium chloride precipitate, and the method further comprises filtering the lithium chloride precipitate from the alane etherate solution prior to removing the portion of solvent from the alane etherate solution to form the alane etherate concentrate.

9. The method of claim 7, wherein the producing the alane etherate solution occurs at a temperature of approximately −5° C. to 0° C.

10. The method of claim 7, wherein the heating the suspension comprises heating the suspension to a temperature of approximately 65° C. to 80° C.

11. The method of claim 7, wherein the first solvent comprises an aromatic solvent, a hydrocarbon solvent, or a mixture thereof.

12. The method of claim 11, wherein the first solvent comprises toluene.

* * * * *